United States Patent
Scott et al.

(10) Patent No.: US 9,443,441 B1
(45) Date of Patent: Sep. 13, 2016

(54) VIEW PORT RESOLUTION INDEPENDENT NETWORK PAGES

(75) Inventors: Sean M. Scott, Sammamish, WA (US); Devraj Varadhan, Bellevue, WA (US); Douglas J. Gradt, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 719 days.

(21) Appl. No.: 12/915,615

(22) Filed: Oct. 29, 2010

(51) Int. Cl.
| | |
|---|---|
| *G06F 3/0481* | (2013.01) |
| *G09B 5/00* | (2006.01) |
| *G06F 17/30* | (2006.01) |

(52) U.S. Cl.
CPC ............... *G09B 5/00* (2013.01); *G06F 3/0481* (2013.01); *G06F 17/30873* (2013.01); *G09G 2340/0407* (2013.01); *G09G 2340/0442* (2013.01)

(58) Field of Classification Search
CPC ............ G06F 3/00; G06F 3/048; G06F 3/14; G06F 3/0481; G06F 17/30873; G09G 2340/0407; G09G 2340/0442
USPC .......................... 715/788, 801, 800, 738, 742
See application file for complete search history.

(56) References Cited

U.S. PATENT DOCUMENTS

| | | | |
|---|---|---|---|
| 6,175,845 B1 * | 1/2001 | Smith et al. ................... | 715/210 |
| 7,328,177 B1 * | 2/2008 | Lin-Hendel ................... | 705/26.7 |
| 7,487,447 B1 * | 2/2009 | Jerger ............................ | 715/252 |
| 8,010,901 B1 * | 8/2011 | Rogers .......................... | 715/751 |
| 8,181,107 B2 * | 5/2012 | Melnyk et al. ................ | 715/238 |
| 2002/0123957 A1 * | 9/2002 | Notarius et al. ................ | 705/37 |
| 2004/0177323 A1 * | 9/2004 | Kaasila et al. ................ | 715/513 |
| 2005/0097458 A1 * | 5/2005 | Wilson .......................... | 715/517 |
| 2005/0102628 A1 * | 5/2005 | Salesin et al. ................ | 715/764 |
| 2006/0242557 A1 * | 10/2006 | Nortis, III ...................... | 715/509 |
| 2007/0204220 A1 * | 8/2007 | Petrov Nickolov et al. . | 715/530 |
| 2008/0263046 A1 * | 10/2008 | Kristensson et al. ............. | 707/9 |
| 2008/0270890 A1 * | 10/2008 | Stern ............................. | 715/239 |
| 2011/0320034 A1 * | 12/2011 | Dearlove et al. ............. | 700/216 |

* cited by examiner

*Primary Examiner* — Doon Chow
*Assistant Examiner* — Le Nguyen
(74) *Attorney, Agent, or Firm* — Thomas Horstemeyer, LLP

(57) ABSTRACT

Disclosed are various embodiments for facilitating transition in a rendering of a network page given a resizing of a view port of a viewing window. A network page is rendered in a computing system in a view port on a display device, the network page defining a plurality of view port resolution ranges. A first level of changes is implemented in a display of the network page in response to a resizing of the view port within a respective one of the view port resolution ranges. A second level of changes is implemented in the display of the network page in response to a resizing of the view port through a transition threshold defined between a respective pair of the view port resolution ranges.

20 Claims, 6 Drawing Sheets

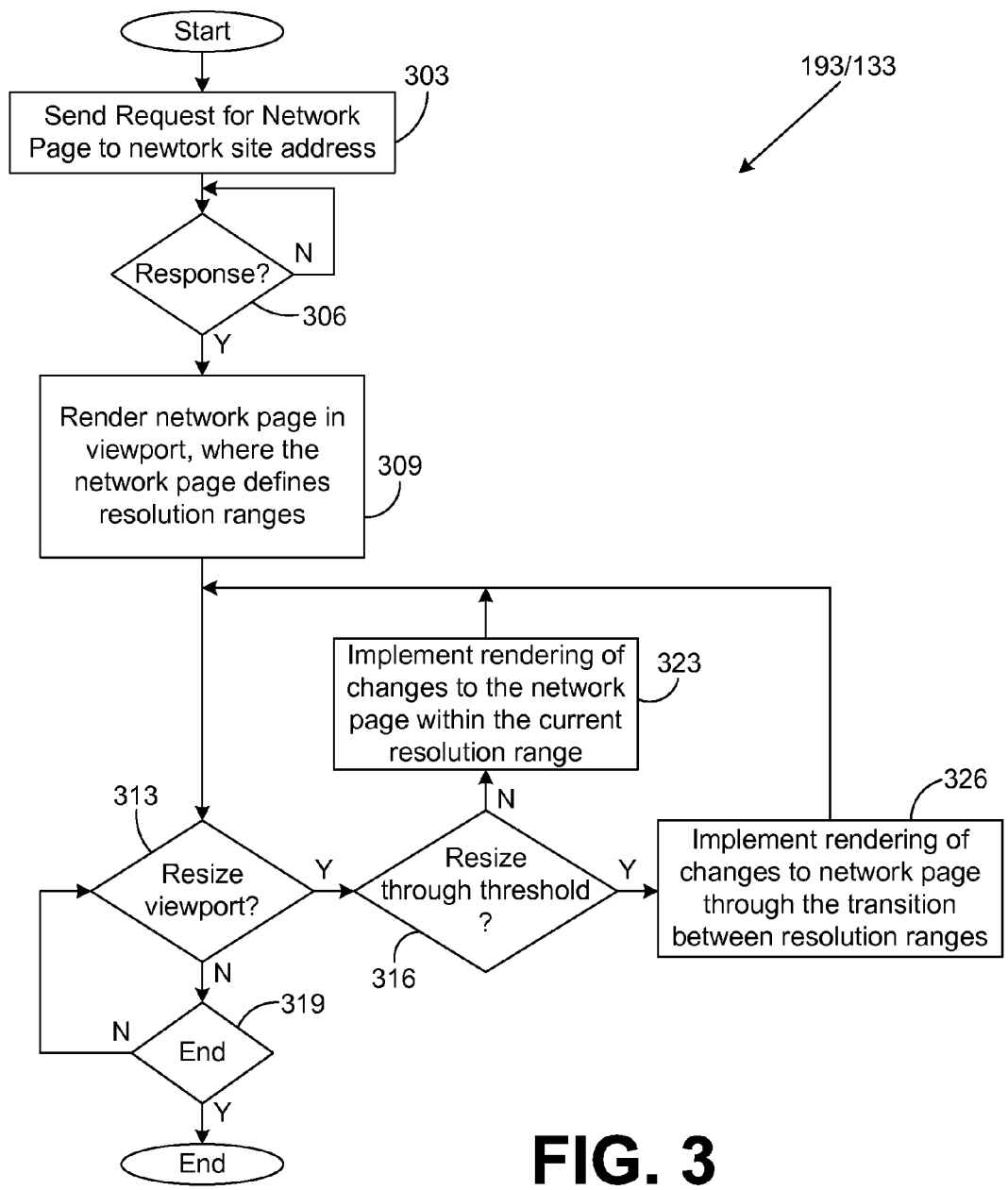

US 9,443,441 B1

VIEW PORT RESOLUTION INDEPENDENT NETWORK PAGES

BACKGROUND

Users may view various web pages and other content through a view port on a display screen. Such view ports may vary in size, and in some cases, the size of the view port relative to the needed display area of a given network page may result in a less than optimal user experience.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 3 is a flowchart illustrating one example of functionality implemented on a client device in the networked environment of FIG. 1 according to various embodiments of the present disclosure.

DETAILED DESCRIPTION

This disclosure involves providing for transition in a display of a network page when a view port of a client side application such as a browser or other rendering application is resized. In one embodiment, various changes are applied to the rendering of the network page based upon the nature of the resizing of the view port. In the following discussion, a general description of the system and its components is provided, followed by a discussion of the operation of the same.

Figure 1:
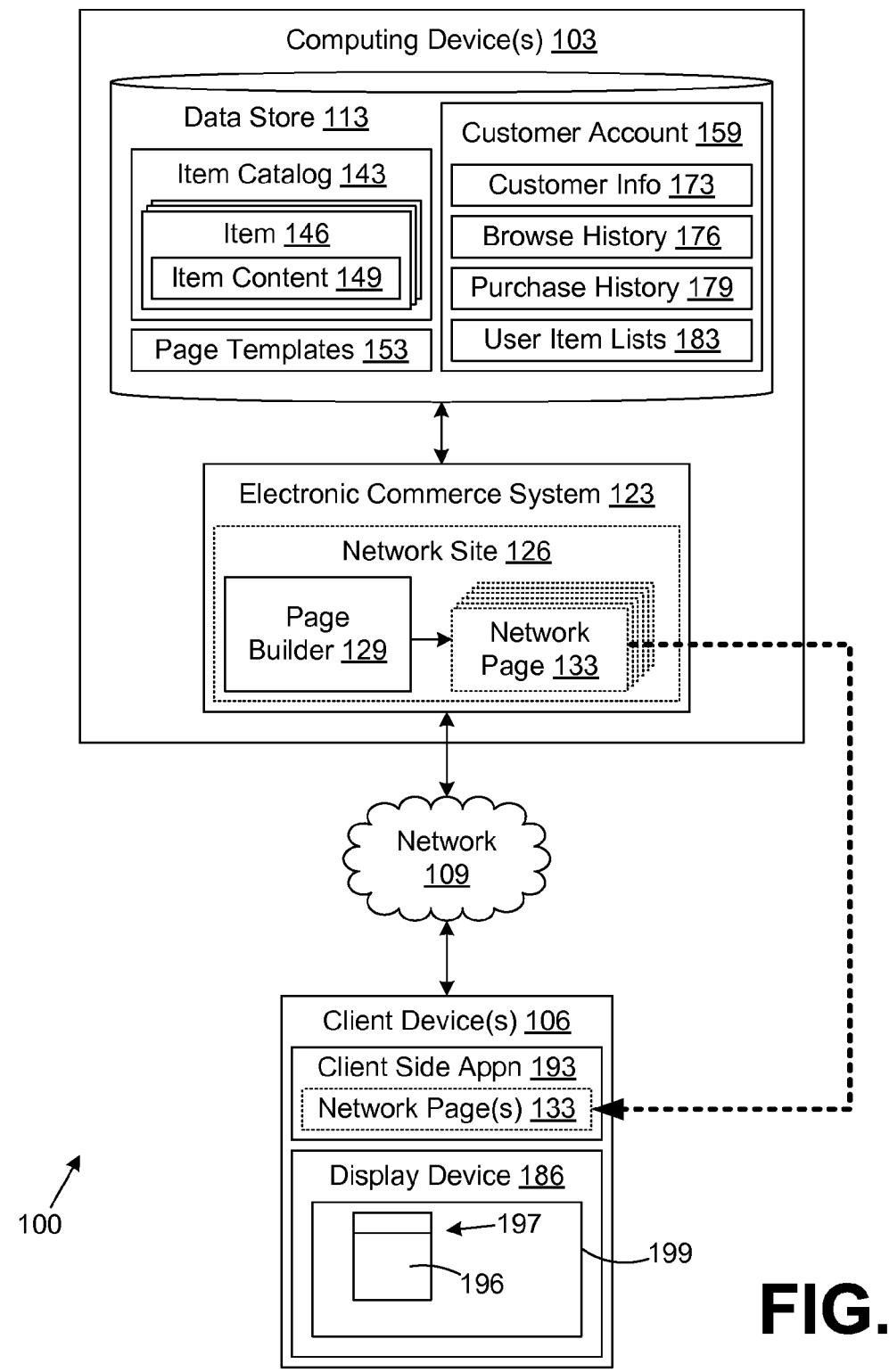
FIG. 1 is a drawing of a networked environment according to various embodiments of the present disclosure.

With reference to FIG. 1, shown is a networked environment 100 according to various embodiments. The networked environment 100 includes one or more computing devices 103 that are coupled to one or more client devices 106 through a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores as can be appreciated. The data stored in the data store 113, for example, is associated with the operation of the various applications and/or functional entities described below.

The components executed on the computing device 103, for example, include an electronic commerce system 123, and other applications, services, processes, systems, engines, or functionality not discussed in detail herein. The electronic commerce system 123 facilitates a network site 126 such as, for example, a web site or other network presence. The electronic commerce system 123 includes a page builder 129 that is executed to generate various network pages 133 as will be discussed.

The data stored in the data store 113 includes, for example, an item catalog 143 that includes a list of items 146. Associated with each item 146 is item content 149 that may comprise, for example, information about an item 146 such as images, text, attributes, and other information. Also stored in the data store 113 are page templates 153 that are employed by the page builder 129 to generate network pages 133. In addition, stored on the data store 113 are customer accounts 159. Each customer account 159 includes various customer data such as customer information 173, a browse history 176, a purchase history 179, and user item lists 183. In addition to the foregoing, there may be other data stored in the data store 113 as well.

The customer information 173 may comprise, for example, customer names, billing addresses, shipping addresses, payment instrument information, electronic mail addresses, and other information as can be appreciated. The browse history 176 comprises a history of the interaction of a given customer with the electronic commerce system 123 in viewing various network pages 133 over time. In this respect, the browse history 176 includes information about items viewed, searches performed, and other information as can be appreciated. The purchase history 179 sets forth the past purchases made by a given user over time.

The electronic commerce system 123 is executed in order to facilitate the online purchase of items 146 over the network 109. The electronic commerce system 123 also performs various backend functions associated with the online presence of a merchant in order to facilitate the online purchase of items 146, as will be described. For example, the page builder 129 of the electronic commerce system 123 generates one or more network pages 133, such as web pages or other types of network content that are provided to client(s) 106 in response to various requests for the purposes of selecting items 146 for purchase, rental, download, lease, or other form of consumption, as will be described.

A network page 133 may include code that generates dynamic network pages when executed or interpreted in the client device 106. The code may be written in any suitable programming language such as, for example, PHP, Perl, Objective C, Java, Ruby, etc. Also, the network pages 133 may also include code configured to be executed or interpreted within the client device 106 in order to facilitate dynamic rendering of the network page 133. Such code may be referred to as an executable and may be written in any suitable programming language such as, for example, Java Script, Java, or other languages.

Network pages 133 may also include static elements that may be expressed, for example, in hypertext markup language (HTML), extensible markup language (XML), and/or any other language suitable for creating network pages 133.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability. The client device 106 includes, for example, a display device 186 such as a cathode ray tube, a liquid crystal display, or other type of display device as can be appreciated.

The client device 106 may be configured to execute various applications such as a client side application 193 and/or other applications. The client side application 193 may comprise, for example, a browser application or other client application that is executed in the client device 106, for example, to access and render network pages 133, such as web pages, or other network content on the display device 186 that were served up by the computing device 103 and/or other servers. Such network pages 133 are rendered within a view port 196 of a viewing window 197, for example, within a display screen 199 of the display device 186 as will be described. The client device 106 may be configured to execute applications beyond the client side application 193 such as, for example, email applications, instant message applications, and/or other applications.

Next, a general description of the operation of the various components of the networked environment 100 is provided. To begin, it is assumed that a user manipulates the client side application 193 or other client-based application on the client device 106 to request a network page 133 from the electronic commerce system 123. The request may comprise, for example, a request for a homepage, a category network page, a search results network page, a product detail network page, or other type of network page as can be appreciated. The request may be communicated from the client device 106 to the electronic commerce system 123 using hypertext transfer protocol (HTTP) or other appropriate protocol as can be appreciated.

Upon receiving such a request, the electronic commerce system 123 employs the page builder 129 to generate the requested network page 133. The page builder 129 may create the requested network page 133 using, for example, template and other information. In generating the network page 133, the page builder 129 defines view port resolution ranges within the network page 133 itself. In one embodiment, each of these view port resolution ranges is expressed in terms of a number of pixels in two dimensions such as an "X" dimension and a "Y" dimension as can be appreciated. Alternatively, the view port resolution ranges specified within the network page 133 may be defined in some other manner.

The page builder 129 also configures the network page 133 to implement various transitions of the display of the network page 133 in response to a resizing of a view port 196 on the client device within a respective one of the view port resolution ranges. The page builder 129 also configures the network page 133 to implement other transitions of the display of the network page 133 in response to a resizing of the view port through a transition threshold defined between two of the view port resolution ranges. According to various embodiments, the page builder 129 configures the network page 133 to implement various transitions of the display of the network page in response to the resizing of the respective view port 196 in the manner that avoids jarring transitions or that limits the view of an entire network page 133 to only a portion as will be described.

Figure 2A:
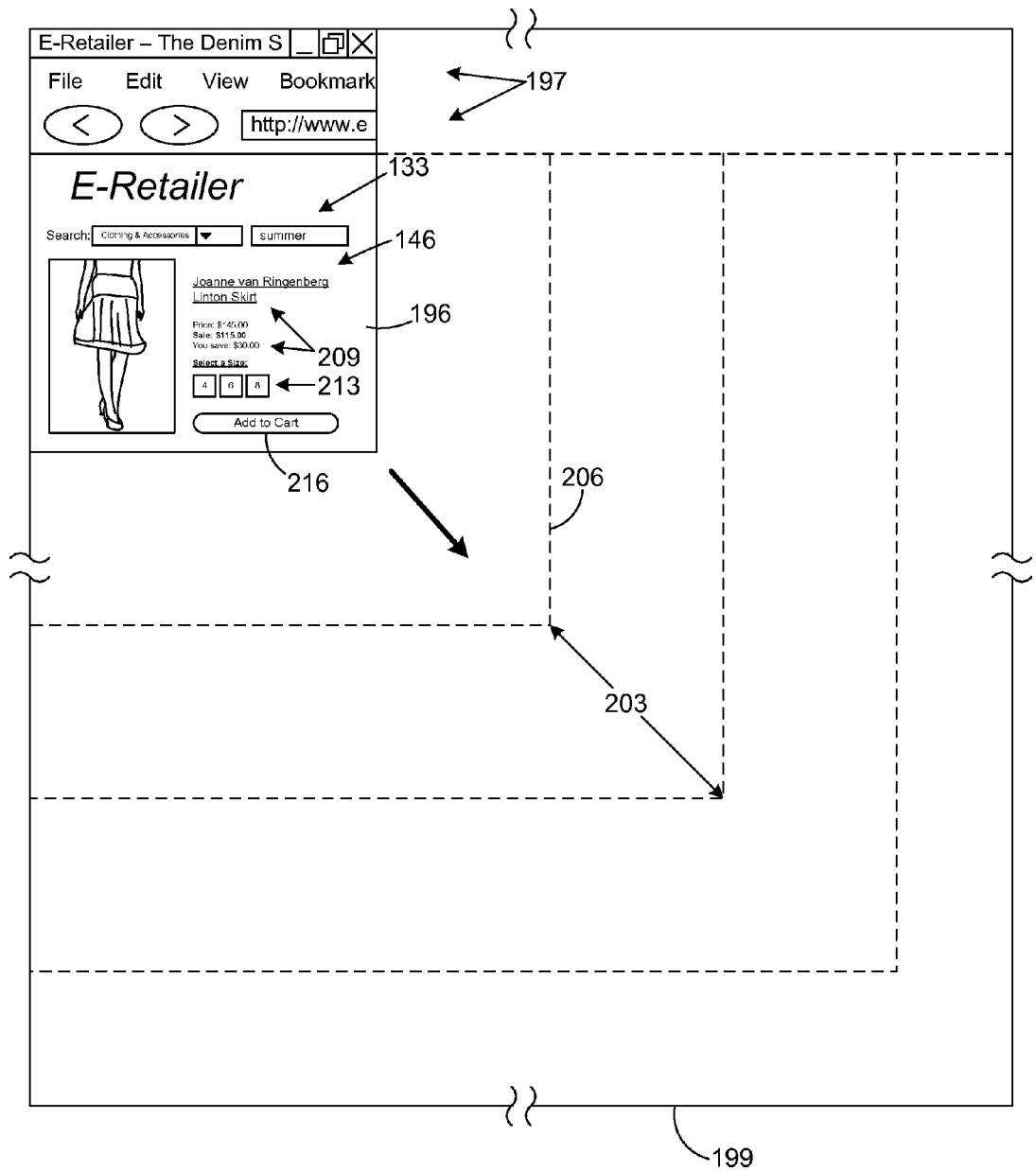
FIGS. 2A-2C are drawings of examples of user interfaces rendered by a client in the networked environment of FIG. 1 according to various embodiments of the present disclosure.

With reference next to FIG. 2A, shown is one example of a display screen 199 according to various embodiments. The display screen 199 includes the viewing window 197 that has the view port 196. The viewing window 197 is much smaller than the size of the display screen 199 as depicted in FIG. 2A. Although the viewing window 197 is located in the corner of the display screen 199, it is understood that the viewing window 197 may be positioned at any location in the display screen 199, where the viewing window 197 is shown in the corner for purposes of illustration of various concepts described herein.

Imposed over the display screen 199 are view port resolution ranges 203 according to various embodiments. The view port resolution ranges 203 comprise a range of sizes of a view port 196 of a viewing window 197. Between each of the view port resolution ranges 203 is a transition threshold 206.

The viewing window 197 and, correspondingly, the view port 196 may be resized using any one of a number of different approaches. For example, a user may grab and drag a corner of the viewing window 197 to expand it to a desired size as can be appreciated. In doing so, the size of the view port 196 may be adjusted within a given view port resolution range 203. Also, the size of the view port 196 may be adjusted across a transition threshold 206 between a respective pair of the view port resolution ranges 203. In fact, the size of the view port 196 may be adjusted across several view port resolution ranges 203 and corresponding transition thresholds 206.

According to various embodiments, the network page 133 that is rendered within the view port 196 is changed or transitioned when resized as described above.

As shown in FIG. 2A, the network page 133 rendered in the view port 196 depicts textual descriptive information 209 of an item 146 including a title, pricing information, an image of the product, and potentially other information. The network page 133 also depicts size selection components 213, an "add to cart" button 216, and potentially other components. It should be understood that the content rendered in the view port 196 as shown in the various versions of the network page 133 depicted herein are merely examples of the many different types of content that may be rendered.

Figure 2B:
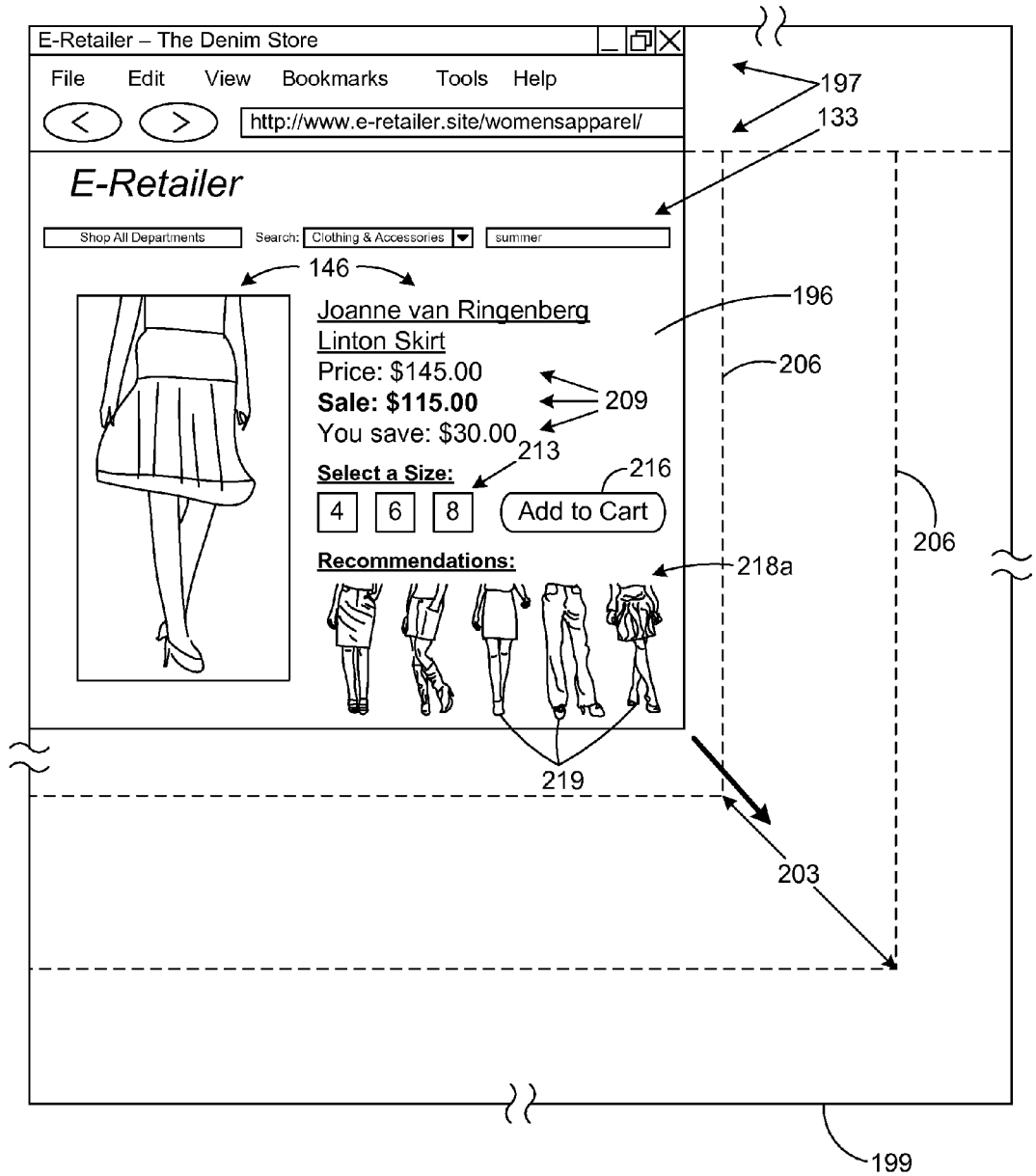

Referring next to FIG. 2B, shown is another depiction of a display screen 199 in which the viewing window 197 and, correspondingly, the view port 196 have been resized and appear much larger than was depicted in FIG. 2A. As shown, the various components depicted in the network page 133 have been resized due to the larger view port 196. The network page 133 was resized through at least one transition threshold 206. The textual descriptive information 209 has been resized with larger font. Also, the size selection components 213 appear much larger. The "add to cart" button 216 has been moved to a different position and has been reduced in length. A recommendations feature 218a has been added to the depiction of the network page 133 that presents, for example, item recommendations that are generated with a view of the item 146 that is the primary subject matter of the network page 133. The recommendation feature 218*a* may comprise, for example, several different content items 219 and it presents one example of many different types of features that may be rendered as part of a network page 133. In one embodiment, a feature 218 may comprise multiple different components. Such components may comprise, for example, push buttons and the like that provide for functionality associated with the feature 218. In addition, it is possible that various content items 219 may be added to other portions of the network page 133. In the example recommendation feature 218*a* shown, a number of images representing products that are recommended to a buyer that are also sold through the electronic commerce system 123 (FIG. 1) are presented based at least in part upon the item 146 depicted in the network page 133.

Figure 2C:
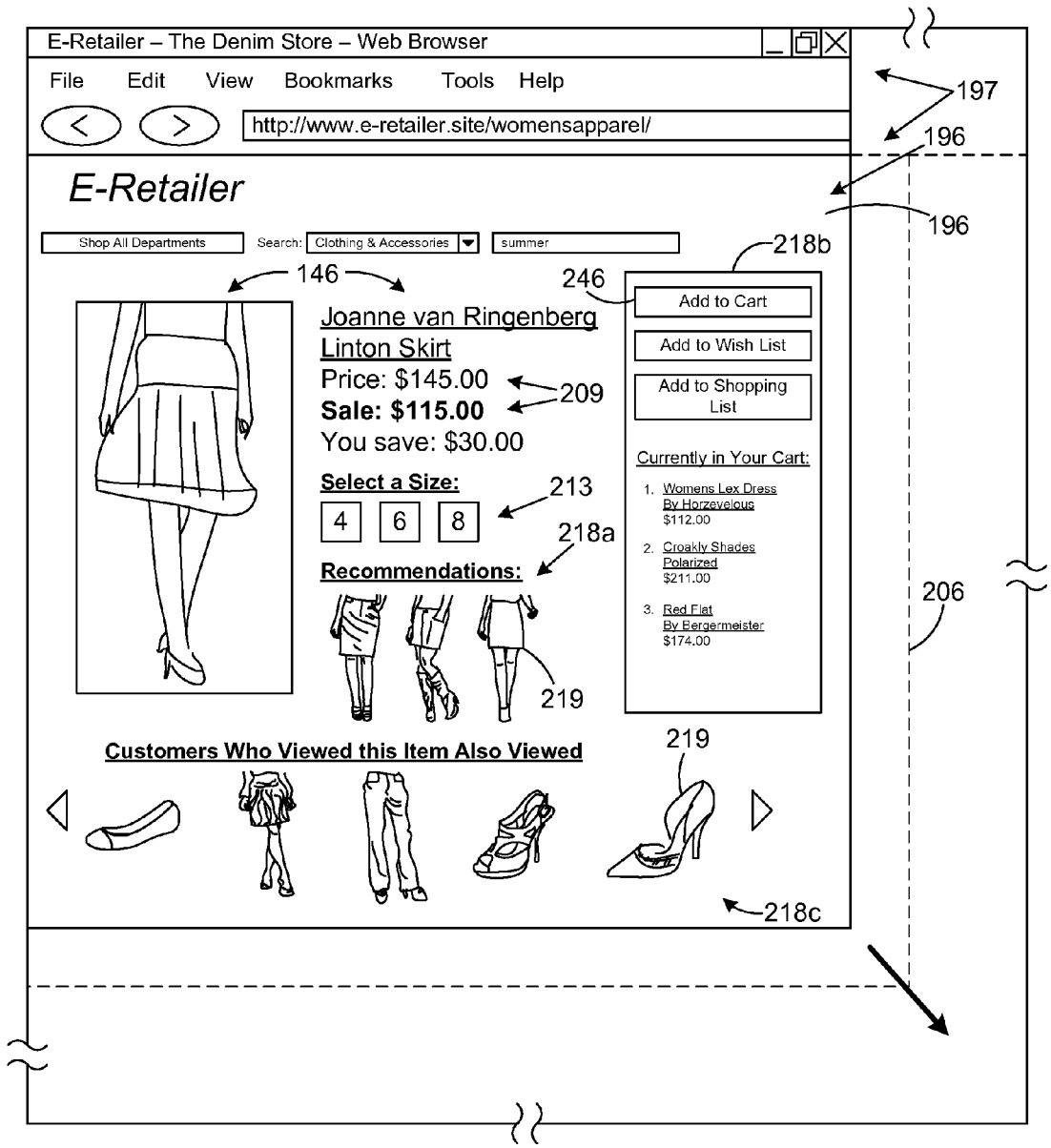

With reference to FIG. 2C, shown is another example of the display screen 199 in which the viewing window 197 and, correspondingly, the view port 196, have both been expanded even further. As shown, various content has been added to the rendering of the network page 133 including features 218 such as a virtual shopping cart feature 218*b* that presents a virtual shopping cart, and a similar items feature 218*c* that comprises a similar items shoveler. The virtual shopping cart feature 218*b* depicts a virtual shopping cart that shows items that have previously been placed therein as well as various buttons. The virtual shopping cart feature 218*b* also replaces the "add to cart" button 216 (FIGS. 2A and 2B) by including a new "add to cart" button 246 within the box that also encloses and graphically defines the virtual shopping cart feature 218*b*. It should be noted that one or more content items 219 have been removed from the recommendations feature 218*a* relative to the depiction of the network page 133 in FIG. 2B. The similar items feature 218*c* includes, for example, functionality to scroll content items 219 comprising images of items 146 to facilitate selection of items 146 by a user. The similar items feature 218*c* presents items 146 that are similar to the primary item presented in the network page 133. For example, if the primary item is a tool box, the similar items presented may comprise alternative tool boxes. Alternatively, another feature that may be rendered is a related items feature that presents items related to the primary item presented in the network page 133. For example, if the primary item presented comprises a tool box, related items may comprise tools. In one embodiment, related items may comprise accessories and the like that are compatible or complementary to a primary item presented.

With reference to FIGS. 2A, 2B, and 2C, the rendering of the network page 133 changes in several respects with the resizing of a view port 196. Stated another way, the network page 133 is configured to transition between different depictions of the content rendered in response to a resizing of the view port 196. The depiction of the content rendered is transitioned as such given that there may be more or less space available after a given resizing occurs to depict various graphical components. Various types of changes that may be implemented to the rendering of a network page 133 include adding components such as features 218, content items 219, and other content to the display of the network page 133. Also, various components such as features 218, content items 219, and other content may be removed from a display, or changed in a display, of the view port 196. In some situations, components such as features 218, content items 219, and other content may be replaced with alternative components.

In addition, previously existing components may be resized, or other versions of the same components may be obtained from a server that are a different size than those that were previously depicted. In resizing text, larger and/or different fonts may be employed. By making the gradual changes as a view port 196 is resized as described above, the user is left with an impression that the network page 133 expands in an eloquent and seamless way as the size of the view port 196 is expanded. Similarly, the same is true in the reverse direction where the rendering of the network page 133 appears to seamlessly and eloquently shrink as the view port 196 is made smaller.

In addition, an advantage is obtained in that a single network page 133 is created that can be rendered on many different display devices 186 of differing sizes without having to create specialized versions of a network page 133 for specific types of displays employed in respective types of client devices 106. For example, the network page 133 may be depicted in large screens on a desktop or laptop, or a small screen of a personal digital assistant or cell phone.

Referring next to FIG. 3, shown is a flowchart that provides one example of the operation of functionality implemented by virtue of the client side application 193 as it renders the network page 133 according to various embodiments. It is understood that the flowchart of FIG. 3 provides merely an example of the many different types of functional arrangements that may be employed to implement the functionality of the client side application/network page 193/133 as described herein. As an alternative, the flowchart of FIG. 3 may be viewed as depicting an example of steps of a method implemented in the client device 106 (FIG. 1) according to one or more embodiments.

The functionality depicted in FIG. 3 shows an example of the joint operation of the client side application 193 and the network page 133 in rendering the content of the network page 133 as will be described. Beginning with box 303, the client side application/network page 193/133 sends a request for the network page 133 to the network site address associated with the electronic commerce system 123 (FIG. 1). Such address may comprise, for example, a uniform resource locator (URL) or other type of address. Such a request may be formatted according to the hypertext transfer protocol (HTTP) or other protocol as can be appreciated. Once a response in the form of a network page 133 is received in box 306, then in box 309, the client side application 193 proceeds to initiate the rendering of the network page 133 in the respective view port 196 (FIG. 1) of the viewing window 197 (FIG. 1). The network page 133 defines the plurality of view port resolution ranges 203 (FIGS. 2A, 2B, 2C) and the transition thresholds 206 (FIGS. 2A, 2B, 2C) between the view port resolution ranges 203 as described above.

In box 313, in rendering the network page 133, the client side application 193 determines or detects whether the view port 196 has been resized based upon user action or input. If so, then the operation proceeds to box 316. Otherwise, the operation progresses to box 319.

Assuming that the view port 196 is to be resized, then in box 316 it is determined whether the view port 196 has been resized through one or more transition thresholds 206. If not, then the operation progresses to box 323. Otherwise, the same progresses to box 326.

In box 323, in rendering the network page 133, the client side application 193 renders a first level of changes on the display of a network page 133 in response to the resizing of the view portal 196 within the respective view port resolution range 203. The first level of changes may also be viewed as first transition of the display of the network page 133. The transition of the rendering of a network page 133 at this first level may involve any one of a number of different types of changes.

For example, as a view port 196 is changed, additional white space may be added or deleted from the rendering of a network page 133. Also, any text that is depicted in the network page 133 may be resized upward or downward by specifying various fonts and font sizes to be employed within the respective view port resolution ranges 203. In addition, other content items depicted within a network page 133 may be resized. Alternatively, various components such as images of items 146 may be replaced by larger or smaller versions of the same images or by different images as can be appreciated. Further, various features 218 (FIGS. 2A-C) may be added, removed, or changed.

In addition, other changes that may be made include moving components to new positions, replacing previously existing content items with alternative content items, or taking other such actions. In one embodiment, the first level of change or transition takes place if the view port 196 is resized within a given view port resolution range 203. In one example, such transitions involve the use of components such as features 218, content items 219, and other content that have already been downloaded from the computing device 103 (FIG. 1) without having to further request additional components from the computing device 103.

Once the rendering of any changes to the network page 133 have taken place in box 323, then the flow reverts back to box 313 where the next change to the resolution of the current view port 196 is detected.

Assuming that the view port 196 has been resized through a given transition threshold 206 as determined in box 316, then in box 326, the rendering of changes to the network page in lieu of a resizing through a transition threshold between resolution ranges is implemented. According to one embodiment, a second level of changes in the display of the network page 133 is implemented in response to the resizing of the view port 196 through a transition threshold defined between a respective pair of view port resolution ranges 203. According to one embodiment, a second level of changes may involve expanding or contracting empty space in the display of the network page, or filling in empty space nearly created with an additional content item. According to one embodiment, the second level of changes or second transition may involve all changes that require additional components such as features 218a-c, content items 219, and other content to be requested and downloaded from the computing device 103. Further, various features 218 (FIGS. 2A-C) may be added, removed, or changed.

Thus, according to one embodiment, any transition within a given view port resolution range 203 can be implemented using only data that already exists at the client device 106, where changes that require further download of information from the computing device 103 are restricted to the times when the view port 196 is resized through a respective transition threshold 206. The second level of changes or the second transition of a network page 133 may also involve changing the font size of a character that appears in the display of a network page 133 or resizing an image or obtaining a large or smaller version of the same image to appear in the display of a network page 133. Further, the second level of changes may also involve replacing a previously rendered component in the network page 133. The second level of changes may also involve adding, removing, changing, or replacing features 218 (FIGS. 2A-C).

In situations where items are added to a network page 133 in either a first or second level of changes described above, it may be possible that an added one of the components such as images and/or text facilitate the presentation of a second item or product that is similar to a first product or item already depicted in the network page 133. In the situation where the network page 133 previously presented a first product, then one or more of the components added to the display may present a second product that is related to the first product.

In another embodiment, a first group or class of types of changes are employed at a first level or first transition involving resizing the view port 196 within a given view port resolution range 203. Accordingly, a second class of types of changes are employed at a second level or second transition involving resizing the view port 196 through one or more transition thresholds 206. In one embodiment, at least some of the types of changes in the first class may be the same as the types of changes in the second class. Alternatively, the types of changes associated with the first class may be different than the types of changes associated with the second class.

By providing for transition ranges 206 between respective view port resolution ranges 203, it possible to restrict the changes that are more disruptive to the view of the network page 133 to discreet points along the total range of view port resolution. This ensures that any disruption to the viewer network page 133 is minimized if a user resizes the view port during rendering of a network page 133. As a consequence, the rendering of the network page 133 is less disruptive and potentially more pleasing to the user. This presumably would translate into greater sales in the case that a network page 133 is part of a network site 126 that facilitates the sale of items as described above.

Figure 4:
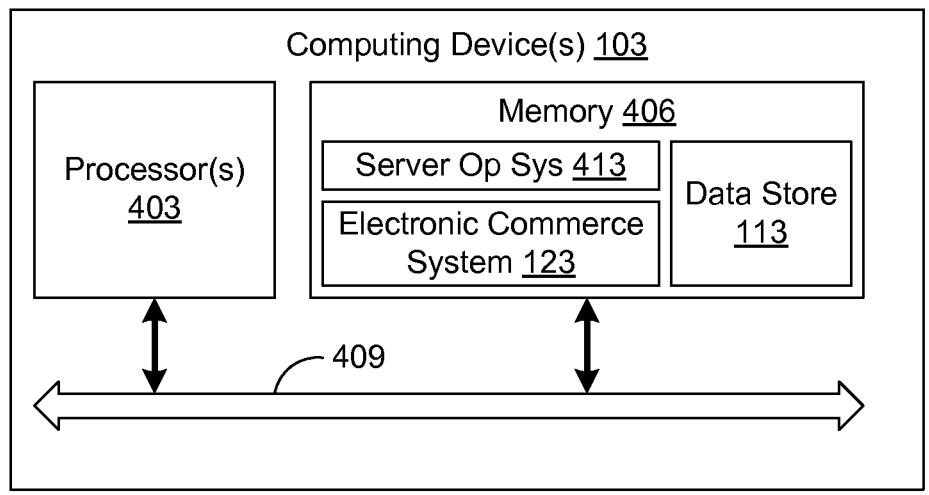
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the electronic commerce system 123 and potentially other applications. Also stored in the memory 406 may be a data store 113 and other data. In addition, an operating system 413 may be stored in the memory 406 and executable by the processor 403.

Figure 5:
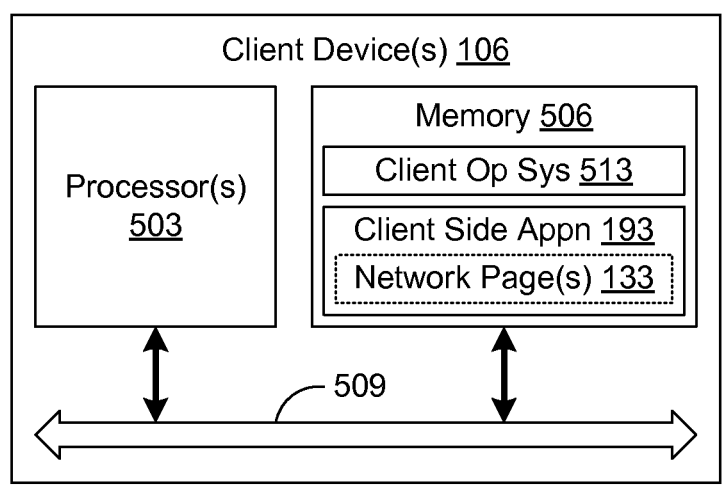
FIG. 5 is a schematic block diagram that provides one example illustration of a client device employed in the networked environment of FIG. 1 according to various embodiments of the present disclosure.

With reference to FIG. 5, shown is a schematic block diagram of the client device 106 according to an embodiment of the present disclosure. The client device 106 includes at least one processor circuit, for example, having a processor 503 and a memory 506, both of which are coupled to a local interface 509. To this end, the client device 106 may comprise, for example, a computing system or like device as mentioned above. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the client side application 193 that renders the network page(s) 133, and potentially other applications. In addition, an operating system 513 may be stored in the memory 506 and executable by the processor 503.

It is understood that there may be other applications that are stored in each of the memories 406/506 and are executable by the processors 403/503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in each of the memories 406/506 and are executable by the respective processors 403/503. In this respect, the term "executable" means a program file that is in a form that can ultimately be run by a processor 403/503. Examples of executable programs may be, for example, a compiled program that can be translated into machine code in a format that can be loaded into a random access portion of a respective memory 406/506 and run by a processor 403/503, source code that may be expressed in proper format such as object code that is capable of being loaded into a random access portion of a memory 406/506 and executed by a processor 403/503, or source code that may be interpreted by another executable program to generate instructions in a random access portion of a memory 406/506 to be executed by a processor 403/503, etc. An executable program may be stored in any portion or component of a memory 406/506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Each of the memories 406/506 is defined herein as including both volatile and nonvolatile memory and data storage components. Volatile components are those that do not retain data values upon loss of power. Nonvolatile components are those that retain data upon a loss of power. Thus, each of the memories 406/506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each processor 403/503 may represent multiple processors, and each memory 406/506 may represent multiple memories, that operate in parallel processing circuits, respectively. In such a case, a local interface 409/509 may be an appropriate network that facilitates communication between any two of the multiple processors 403/503, between any processor 403/503 and any of the memories 406/506, or between any two of the memories 406/506, etc. Each local interface 409/509 may comprise additional systems designed to coordinate this communication, including, for example, performing load balancing. Each processor 403/503 may be of electrical or of some other available construction.

Although electronic commerce system 123 including the page builder 120, and the network pages 133 as executed by a client side application 193, and other various systems or pages described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of portions of the network page 133 as rendered by the client side application 193. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403/503 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 123 and a network page 133 executed or rendered by a client side application 193, that comprises software or code can be embodied in any non-transitory computer-readable medium for use by or in connection with an instruction execution system such as, for example, a processor 403/503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein the program, when executed, causes the computing device to:
   generate a network page in response to a request from a client device;
   define a plurality of view port resolution ranges in the network page;
   configure the network page to specify that a plurality of content items are to be downloaded from a server in association with a rendering of the network page, the content items being associated with a respective one of the view port resolution ranges that includes an initial size of a view port on the client device;
   configure the network page to implement a first transition of a display of the network page after an initial rendering of the network page in response to resizing the view port on the client device within the respective one of the view port resolution ranges, wherein:
      resizing results from a user interaction with the client device by a user of the client device; and
      the first transition employs the content items currently stored in the client device; and
   configure the network page to implement a second transition of the display of the network page after the initial rendering of the network page in response to resizing the view port through a transition threshold defined between a respective pair of the resolution ranges, wherein resizing results from a user interaction with the client device by the user of the client device and the second transition involves downloading at least one additional content item to be displayed in the view port, wherein:
      the additional content item replaces a previously rendered one of the content items in the network page; or
      the additional content item is added to the display of the network page.

2. The non-transitory computer readable medium of claim 1, wherein implementation of the first transition of the display further comprises causing the computing device to configure the network page to expand an empty space in at least one location in the display of the network page.

3. The non-transitory computer readable medium of claim 1, wherein implementation of the first transition of the display further comprises causing the computing device to configure the network page to change a size of an image appearing in the display of the network page.

4. The non-transitory computer readable medium of claim 1, wherein the first transition of the display further comprises a change in a font size of at least one character that appears in the display of the network page.

5. The non-transitory computer readable medium of claim 1, wherein the first transition of the display further comprises a change in a size of an image appearing in the display of the network page.

6. The non-transitory computer readable medium of claim 1, wherein the additional content item comprises a related items feature.

7. The non-transitory computer readable medium of claim 1, wherein the additional content item comprises a virtual shopping cart.

8. A system, comprising:
   a computing device configured to at least:
      generate a network page in response to a request from a client device;
      define a plurality of view port resolution ranges in the network page;
      configure the network page to specify that a plurality of content items are to be downloaded from a server in association with a rendering of the network page, the plurality of content items being associated with a respective one of the plurality of view port resolution ranges that includes an initial size of a view port on the client device; and
      configure the network page to
         implement a first transition of a display of the network page after an initial rendering of the network page in response to a resizing of the view port on the client device within the respective one of the plurality of view port resolution ranges, wherein:
            the resizing of the view port results from a user interaction with the client device by a user of the client device; and
            the first transition employs the plurality of content items downloaded from the server and stored in the client device; and
         implement a second transition of the display of the network page after the initial rendering of the network page in response to a resizing of the view port through a transition threshold defined between a respective pair of the view port resolution ranges, wherein the resizing of the view port results from a user interaction with the client device by the user of the client device and the second transition involves downloading at least one additional content item to be displayed in the view port, wherein:
            the additional content item replaces a previously rendered one of the plurality of content items in the network page; or
            the additional content item is added to the display of the network page.

9. The system of claim 8, wherein implementation of the first transition of the display further comprises a change in a size of an image appearing in the display of the network page.

10. The system of claim 8, wherein implementation of the first transition of the display further comprises an expansion of an empty space in at least one location in the display of the network page.

11. The system of claim 8, wherein the first transition of the display further comprises a change in a font size of at least one character that appears in the display of the network page.

12. The system of claim 8, wherein the first transition of the display further comprises a change in a size of an image appearing in the display of the network page.

13. The system of claim 8, wherein the additional content item comprises a shopping cart.

14. The system of claim 8, wherein the additional content item comprises a similar items feature or a related items feature.

15. A method, comprising:
- generating, via a server, a network page in response to a request from a client device;
- defining, via the server, a plurality of view port resolution ranges in the network page;
- configuring, via the server, the network page to specify that a plurality of content items are to be downloaded from a server in association with a rendering of the network page, the content items being associated with a respective one of the view port resolution ranges that includes an initial size of a view port on the client device;
- configuring, via the server, the network page to implement a first transition of a display of the network page after the an initial rendering of the network page in response to resizing the view port on the client device within the respective one of the view port resolution ranges, wherein:
  - resizing results from a user interaction with the client device by a user of the client device; and
  - the first transition employs the content items currently stored in the client device; and
- configuring, via the server, the network page to implement a second transition of the display of the network page after the initial rendering of the network page in response to resizing the view port through a transition threshold defined between a respective pair of the resolution ranges, wherein resizing results from a user interaction with the client device by the user of the client device and the second transition involves downloading at least one additional content item to be displayed in the view port, wherein:
  - the additional content item replaces a previously rendered one of the content items in the network page; or
  - the additional content item is added to the display of the network page.

16. The method of claim 15, wherein the first transition of the display further comprises changing a font size of at least one character that appears in the display of the network page.

17. The method of claim 15, wherein the first transition of the display further comprises changing a size of an image appearing in the display of the network page.

18. The method of claim 15, wherein implementation of the first transition of the display further comprises expanding an empty space in at least one location in the display of the network page.

19. The method of claim 15, wherein the additional content item comprises a similar items feature.

20. The method of claim 15, wherein the additional content item comprises a virtual shopping cart.

* * * * *

UNITED STATES PATENT AND TRADEMARK OFFICE
CERTIFICATE OF CORRECTION

PATENT NO. : 9,443,441 B1
APPLICATION NO. : 12/915615
DATED : September 13, 2016
INVENTOR(S) : Scott et al.

Page 1 of 1

It is certified that error appears in the above-identified patent and that said Letters Patent is hereby corrected as shown below:

At Column 11, Claim 1, Line 52, delete:
"a respective pair of the resolution ranges"
And replace with:
--a respective pair of the view port resolution ranges--.
AND
At Column 11, Claim 1, Line 53, delete:
"a user interaction"
And replace with:
--the user interaction--.
AND
At Column 12, Claim 8, Line 50, delete:
"a resizing of"
And replace with:
--the resizing of--.
AND
At Column 12, Claim 8, Line 54, delete:
"a user interaction"
And replace with:
--the user interaction--.
AND
At Column 13, Claim 15, Line 24, delete:
"a server"
And replace with:
--the server--.
AND
At Column 14, Claim 15, Line 9, delete:
"a user interaction"
And replace with:
--the user interaction--.

Signed and Sealed this
Twenty-eighth Day of November, 2017

Joseph Matal
*Performing the Functions and Duties of the
Under Secretary of Commerce for Intellectual Property and
Director of the United States Patent and Trademark Office*